R. T. Osgood,
Sinker.
No. 93,220.   Patented Aug. 3, 1869.
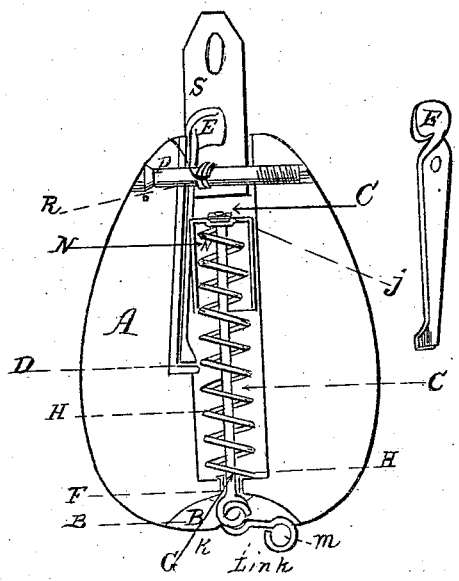
Witnesses
O. B. Trott
A. P. Puck
Inventor
R. T. Osgood

United States Patent Office.

ROBERT T. OSGOOD, OF ORLAND, MAINE.

*Letters Patent No. 93,220, dated August 3, 1869.*

---

IMPROVEMENT IN FISHING-LINE SINKERS.

---

The Schedule referred to in these Letters Patent and making part of the same.

---

Be it known that I, ROBERT T. OSGOOD, of Orland, in the county of Hancock, in the State of Maine, have invented a new and useful Improvement in Fishing-Line Sinkers; and I do declare that the following is a full and exact description thereof, reference being had to the accompanying drawings, and letters of reference marked thereon.

The nature of my invention consists in providing an egg-shaped leaden fishing-line sinker, A, with a concavity, B, in the lower or largest end, having a hole or chamber, C, through the centre, lengthwise, to admit springs and other combinations, for the purpose of catching fish.

To enable others skilled in the art to make and use my invention, I will proceed to describe its construction and operation.

First, I cast the body of my sinker, A, in a mould of any required size, egg-shaped, with a concavity B, in the largest end, and with a hole or chamber, C, through it lengthwise, also of any required bore or size. This chamber C has a depression, D, made in the side of it, to admit the lever-pawl E.

I have a friction-thimble, F, inserted in the bottom of this chamber C, with a small hole through it, to admit a sliding rod, G, for the purpose of preventing the lead from wearing away, and to make a better floor for the spiral spring H, or its equivalent, (a piece of India-rubber tubing,) to rest upon.

I have a sliding rod, G, of any required length, for any given-sized sinker, made with a screw and nut, J, upon the upper end, with an eyelet, K, upon the lower end, to receive a short link, L, made of similar wire, bent S-shaped. One end of this link L is secured in the eyelet of rod G, and the other being also formed into an eyelet, M, is made only sufficiently long to pass over the sides of the concavity B, and admit the fly-line for the hooks to be inserted.

I have a wire spiral spring, H, or a piece of India-rubber tubing, as an equivalent for a main-spring, to be inserted in the chamber C, of nearly the length of the sinker A.

I then have a cylindrical sliding thimble, N, made flat, and rough on the top or upper end, with a depression for the nut, and a small hole through it for the sliding rod G to rotate in, and deep enough to rest upon the floor of the chamber C, when hauled hard down. I then put the sliding rod G up through the friction-thimble F, main-spring H, and sliding thimble N, within the chamber C, screw down the nut J, with a thin washer between it and the thimble N, and I have a complete, flexible, rotating swivel within the sinker, which cannot be fouled or damaged by external blows.

I then have a pin, P, put through near the top of the walls, and across the centre of the bore of the chamber C, to hold the pawl E, and its spring, R, in position for setting it. This pin also holds the short leather strap S, to which the line is to be secured, and is made of round wire, with a short screw cut upon one end, and a grooved head upon the other, so that it can be turned in or out, as occasion requires, to adjust any of the combinations within the chamber C.

I have a lever-pawl, E, of sufficient length to reach down nearly to the top of the sliding thimble N, when it is drawn hard down, having the pin P pass through it, near the upper end, to keep it in position. The lower end of this pawl rests upon the upper end of the sliding thimble N, when it is set for fishing, which keeps both pawl and sliding thimble rigidly in that position until released by a sudden jerk, or pull upon the hook-line and sliding rod G, when the pawl immediately returns to its place in the depression D, by means of a short wire spring, R, being wound around the pin P, with one end resting against the upper end of the lever-pawl E, and the other end being bent over, is made to rest in the groove of the depression in the wall at the top of the chamber C.

The upper end of this pawl is bent or twisted so as to be at a right angles with the lower portion, and is made to pass within the loop of the line-strap S, to serve as a thumb-piece or lever, to set the pawl out over the sliding thimble N, when desired, by pressing the thumb against the strap S, in opposition to the short spring R.

The leather strap S is made short, with corresponding holes through the ends, to secure the line in, and wide enough to cross the mouth of the chamber C, with its loop within it under the pin P.

The advantages of this sinker, I claim, are a rigid fly-line sinker, to bite upon when set, and a flexible, rotating one, to haul in when the fish is hooked; also, a perfect swivel-joint, when it is set, and when it is not set, which cannot be fouled up by the tangling of lines, or be easily got out of order. Another advantage is, the hanging is safe and simple, and can be removed in one minute, in case of accident, to substitute another sinker.

What I claim as my invention, and desire to secure by Letters Patent, is—

1. The chambered line-sinker A, having the shape of an egg, with a concavity, B, in the larger end, in combination with the link L, as and for the purpose described.

2. The combination of the rod G, sliding thimble N, and spring H, with the swinging pawl E, as and for the purpose described.

3. The pin P, spring R, and lever E, in combination with the strap S, as and for the purpose set forth.

4. The arrangement, within the sinker A, of the spring H, sliding thimble N, and sliding rod G, as and for the purpose specified.

ROBERT T. OSGOOD.

Witnesses:
O. B. TROTT,
O. R. BUCK.